From United States Patent Office, 3,449,889, Patented June 17, 1969.

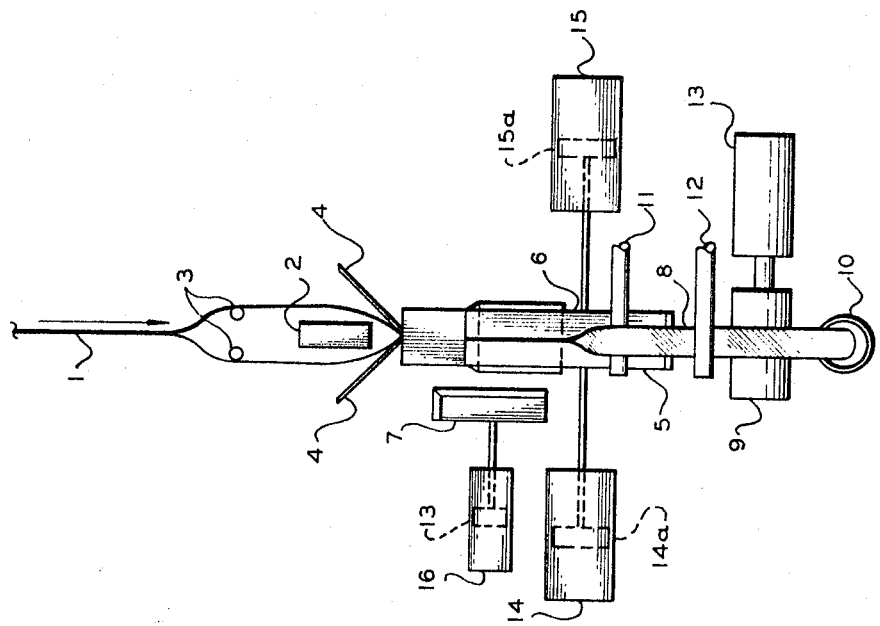
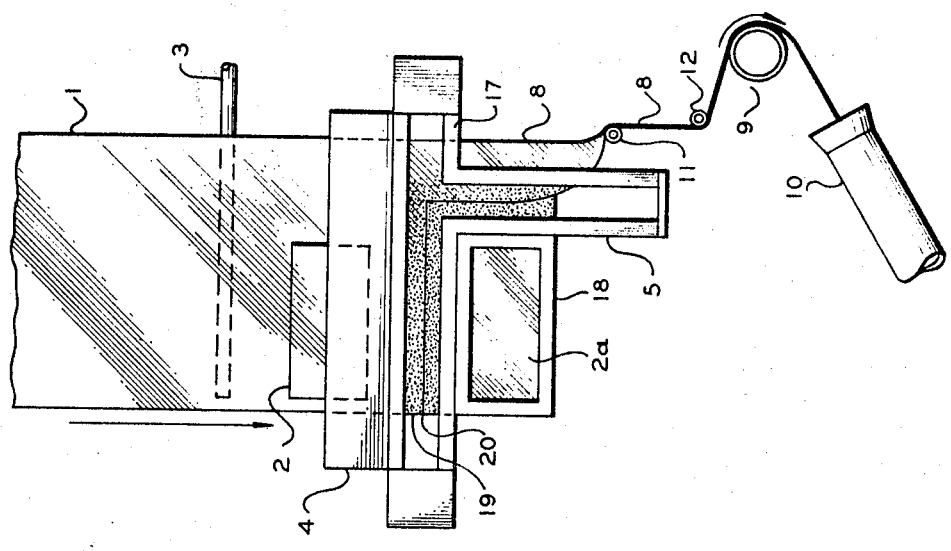

3,449,889
SCRAP REMOVAL FROM THERMOPLASTIC PACKAGING OPERATIONS
Edwin A. Molitor, Jr., Cincinnati, Ohio, assignor to Phillips Petroleum Company, a corporation of Delaware
Filed Nov. 21, 1966, Ser. No. 595,909
Int. Cl. B65b 9/12, 7/06, 61/04
U.S. Cl. 53—182                     3 Claims

ABSTRACT OF THE DISCLOSURE

In the sealing of thermoplastic sheets of material about an object wherein the sheets are intermittently advanced and sealed, the strip trimmed from the sealed edge is fed over a friction drum operating at a greater surface speed than the maximum advance speed of the strips, so as to maintain a positive pull on the strip, both during the rapid acceleration when the operation is advancing, and during the time when the films are stationary preparatory to sealing.

---

Figure 3:
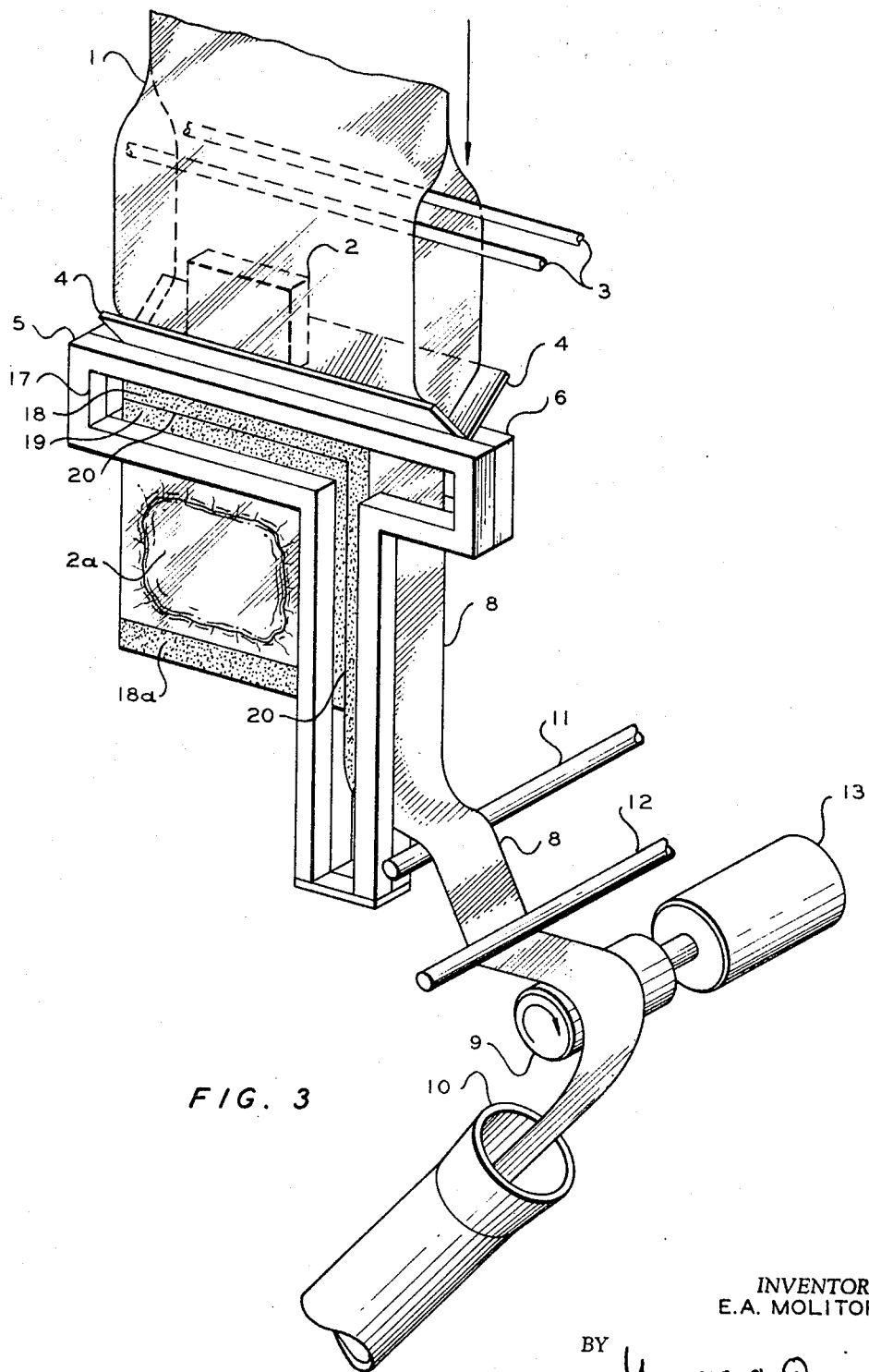

This invention relates to thermoplastic sealing and packaging operations. In another aspect, this invention relates to a novel method of and apparatus for scrap removal from thermoplastic sealing operations.

Machines for packaging objects by heat sealing thermoplastic material in an enclosed relationship around the object are basically of two types. In the first type, an object is placed between two juxtapositioned sheets of thermoplastic material, and the thermoplastic material is sealed together around the four sides of circumference of the object. This is normally accomplished by a continuous process wherein rolls of thermoplastic material are intermittently fed into a heat sealing machine, an object sealed therebetween, and subsequently cut therefrom. In the second type of sealing apparatus, an object is placed between the spread-apart sides of folded thermoplastic sheet material, and the folded sheets are sealed together around the three non-enclosed sides of the object. The thermoplastic material used in heat sealing operations is normally derived from polymers and copolymers of 1-olefins such as ethylene, propylene and 1-butene and from vinyl polymers and copolymers.

Since thermoplastic sheet stock is rarely the same width as the object to be packaged, it is necessary when utilizing both the above-mentioned types of apparatus to cut the excess thermoplastic material from around the edges of the sealed package. This operation is normally carried out in conjunction with the sealing process. Conventional methods utilize either gravity or a vacuum source to remove cut scrap from the sealing zone. However, problems arise many times when using these methods when scrap strips hang on metal parts near the sealing zone, bunch up, and finally back up into the sealing zone. When this occurs, pieces of scrap oftentimes get trapped between the thermoplastic films that are to be sealed by the thermal sealing bar. This usually results in weak seals or no seal at all because the temperature of the sealing bar in the machine is normally preset to seal only two thermoplastic layers of a certain thickness, and the inclusion of more layers will result in a weaker seal or no seal at all in that particular area. Also, when scrap strips do get sealed within two thermoplastic layers, this results in an unattractive package with a resulting loss of sales potential to the ultimate consumer.

Therefore, one object of this invention is to provide an improved packaging apparatus.

Another object of this invention is to provide a novel method of and apparatus for scrap removal in thermoplastic sealing and packaging operations.

According to one embodiment of this invention, scrap is removed from the sealing zone of a thermoplastic packaging device by engaging the scrap and maintaining a positive pull thereon in a direction away from the sealing mechanism.

According to another embodiment of this invention, a positive pull is maintained on a scrap strip or strips by running the scrap strip or strips over the rough surface of a rotating drum. The surface speed of the drum is maintained higher than the speed that the scrap advances from the cutting and sealing zone at any time during the sealing operation. The scrap passes over the drum and normally through a vacuum pipe into a receptacle. When removed in this manner, a positive pull is continuously being maintained on the strip of scrap and the sagging and resultant slack in the strip is eliminated, which in turn eliminates the possibility of the scrap being detained and stacked up on metal parts within the machine.

This invention can be better understood from a study of the enclosed drawings in which FIGURE 1 is an elevation view of packaging machine with the film-removing apparatus of this invention attached thereto, and FIGURE 2 is a side view of the apparatus of FIGURE 1 with certain members removed in order to better illustrate the invention. FIGURE 3 is a perspective view of the apparatus of FIGURE 2 illustrating the operation of this invention. It must be understood that this invention is applicable to any packaging apparatus which produces a continuous strip or strips of scrap material, and is not intended to be limited by the apparatus illustrated in the drawings.

Referring to FIGURES 1 and 2, gripper jaws 5 and 6 carrying supports 4 thereon cooperate to close about object 2a contained between folded thermoplastic sheet 1. Spreader bars 3 are positioned above supports 4 to spread apart the open sides of folded thermoplastic sheet 1 being fed from a folded film feeding mechanism (not shown). Gripper jaws 5 and 6 can be either mechanically or pneumatically actuated but are shown actuated by pistons 14a and 15a contained within pneumatic cylinders 14 and 15, respectively (FIGURE 1). Gripper jaw 5, which is L-shaped, is shown (FIGURE 2) gripping the thermoplastic sheet material at the top and side of object 2a. L-shaped cutting and sealing plate 7 actuated by piston 13 in pneumatic cylinder 16 is operatively positioned to move forward and fit within the L-shaped recess 17 of gripper jaw 5 and to simultaneously cut and seal the thermoplastic material around two sides of object 2a. Blade 7 will cut object 2a from the thermoplastic material and leave continuous strip 8 attached thereto.

Bars 11 and 12, rough surface drum 9, and vacuum pipe 10 are spaced as shown in FIGURE 2 so that scrap 8 cut from the folded thermoplastic sheet will pass over bar 11, under bar 12 and over rough surface drum 9 into vacuum pipe 10. Rough surface drum 9 is rotated in the direction of travel of strip 8 by motor 13.

The operation of this invention is illustrated by FIGURE 3. Folded thermoplastic sheet material passes down from a folded film feeding mechanism not shown. Spreaders 3 spread the film so that an object 2 may be inserted therebetween. Object 2 can be inserted either by hand or by mechanical apparatus, and after insertion, object 2 rests upon the portion of film 1 that is between object 2 and supports 4. Prior to the opening of gripper jaws 5 and 6, cutting and sealing blade 7 (not shown in FIGURE 3) is first actuated to slide into recess 17 and to thereby seal the folded sheet 1 together along areas 18 and 19 while simultaneously cutting through the folded sheet 1 along line 20 around object 2a. The bottom end of folded thermoplastic sheet 1 was sealed together along area 18a in the previous cycle when object 2a was resting in the position of object 2 as illustrated in FIGURE 3.

Thus, when gripper jaws 5 and 6 open, object 2a sealed within the thermoplastic sheet material will drop into a hopper or bin or on an endless belt whereby it is transferred to storage, and object 2 will slide between the folded thermoplastic sheet 1 until it stops and rests on seal 18. Folded thermoplastic film 1 will then advance until object 2 assumes the old position of object 2a. Gripper jaws 5 and 6 will close about object 2 and cutting and sealing blade 7 will be actuated to again move forward and fit within L-shaped recess 17 to again cut and seal the thermoplastic sheet material around the object.

As shown, a continuous strip 8 of thermoplastic film leaves the cutting and sealing zone as scrap. Therefore, when gripper jaws 5 and 6 open and thermoplastic film 1 is advanced, scrap 8 will be pulled over bar 11 and under bar 12 by the force of rotating drum 9 which is offset from bar 12 to assure maximum contact with scrap 8 on the surface of said rotating drum 9. Scrap 8 is then directed back under rough surface drum 9 into pipe 10. It is preferred that air be pulled through pipe 10 in order to assure that no gapping occurs on scrap 8 between pipe 10 and rough surface drum 9. The surface speed of rough surface drum 9 is maintained greater than the maximum feed speed of the folded film feeding mechanism by motor 13. Therefore, when utilizing this mechanism, a positive force is maintained on continuous strip 8 at all times during the sealing operation.

In an alternative arrangement, bar 12 is eliminated and rough surface drum 9 is there positioned. Vacuum pipe 10 is then located above or to one side of rough surface drum 9 so that scrap 8 will pass over bar 11 and over more surface of rough surface drum 9 and then into vacuum pipe 10. In another embodiment, bar 11 is eliminated. Thus, upon rapid feeding of folded thermoplastic sheet 1, scrap 8 tends to drop down around rough surface drum 9 engaging more of its surface and increasing both the frictional contact area and the contact pressure which in turn increases the frictional driving force on the film when it is most needed. It is also within the scope of this invention to place a second rotary drum in the approximate position of pipe 10 to operate in a similar manner as rough surface drum 9, and pipe 10 may thereby be eliminated.

It must also be noted that when cutting strips from two sides of a sealed object, a pair of the above-mentioned rough surfaced drums can be utilized to remove the scrap from the sealing and cutting zones. This normally occurs when objects are sealed between two separate sheets of thermoplastic material. Bars 11 and 12 can be either metal or wooden non-movable bars, or roller bars suspended upon bearings. Rough surfaced drum 9 can be a metal drum with an abrasive such as sandpaper attached to the periphery thereof, or it can be any type drum with a non-slippery surface. The surface of rough surfaced drum 9 and the speed of rotation should be selected so that the resultant coefficient of friction between the drum and the plastic film is within the range of from about 0.05 to about 1.0. Below 0.05 a negligible pull results and when the coefficient of friction exceeds 1.0 too much force would be exerted and the film might therefore be pulled apart or worn through.

I claim:
1. In a thermoplastic sealing machine comprising in combination:
    (a) means for intermittently advancing juxtapositioned sheets of thermoplastic material;
    (b) jaw means for securing an object between predetermined lengths of said sheets in a position to be sealed;
    (c) sealing and cutting means for sealing an object within said predetermined length of said sheets, for cutting continuous lengthwise strips along said predetermined lengths of said sheets, and for cutting said sealed object from said sheets along the widths thereof;
    (d) rough surfaced rotating drum means operatively positioned to engage said continuous lengthwise strips;
    (e) means to cause the angular speed of said rough surface drum to be maintained so that the speed of the surface of said drum is greater than the maximum advance speed of said sheets, so as to maintain a positive pull thereon in a direction away from said jaw means at all times.

2. The apparatus of claim 1 wherein said continuous lengthwise strips are fed over a first feeder bar and then under a second feeder bar and then over said rotating drum so that maximum contact between said strip and said drum is maintained.

3. The apparatus of claim 2 further comprising a vacuum pipe to which said continuous lengthwise strips are fed from said rough surface rotating drum.

References Cited

UNITED STATES PATENTS 3,191,474   6/1965   Grevich et al. _____53—372 X
3,364,650   1/1968   House _____ 53—182

THERON E. CONDON, *Primary Examiner.*

E. F. DESMOND, *Assistant Examiner.*

U.S. Cl. X.R.

53—372